No. 660,741. Patented Oct. 30, 1900.
A. W. WATKINS & R. LENK.
APPLIANCE FOR MAKING METALLIC CONNECTIONS BETWEEN ELECTRIC CONDUITS.
(Application filed Mar. 13, 1900.)
(No Model.)
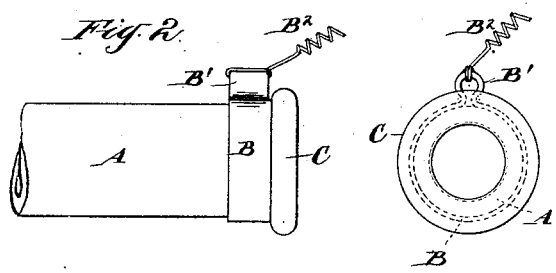
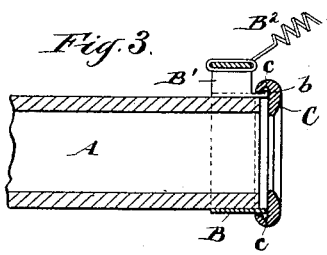
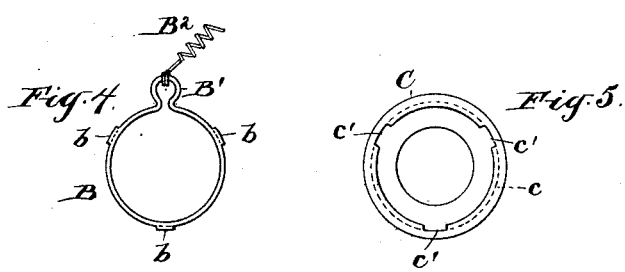
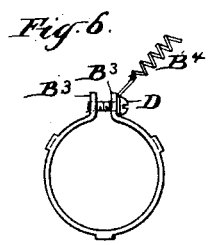
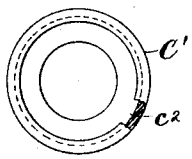
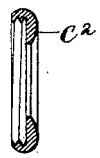
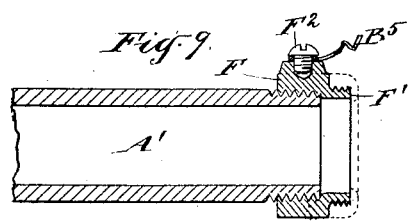
Witnesses:
Carl Lenk
John Nutry
Inventors.
Alfred W. Watkins
Rudolph Lenk
by Thos. Hall atty
THE NORRIS PETERS CO., PHOTO-LITHO., WASHINGTON, D. C.

United States Patent Office.

ALFRED W. WATKINS AND RUDOLPH LENK, OF NEW YORK, N. Y.

APPLIANCE FOR MAKING METALLIC CONNECTIONS BETWEEN ELECTRIC CONDUITS.

SPECIFICATION forming part of Letters Patent No. 660,741, dated October 30, 1900.

Application filed March 13, 1900. Serial No. 8,485. (No model.)

*To all whom it may concern:*

Be it known that we, ALFRED W. WATKINS and RUDOLPH LENK, residents of the borough of Brooklyn, city and State of New York, have invented a new and useful Appliance for Making Metallic Connections Between Electric Conduits or for other Purposes, of which the following is a specification.

In placing wires for electric conduction in buildings and other places where metallic pipes or conduits are used it is necessary to have the metal of the conduit permanently and effectually grounded throughout. It has been and is the custom to use iron pipes as conduits for the wires and to ground the pipes by soldering a wire to the pipe, which work is difficult, and our invention is designed to improve and simplify the wiring by the use of a collar placed on the end of the pipe or conduit and in metallic contact. To the collar is attached a suitable conducting-wire by means of a binding-screw or by soldering the wire to some part of the collar. The collar is also so made that it can be utilized for holding a ring of insulating material against the end of the pipe as a safeguard against abrasion and consequent grounding of the current.

The accompanying drawings, forming part of this specification, show the construction of our invention.

Figure 1 is an end view of conduit with the appliance attached. Fig. 2 is a side view of the same. Fig. 3 is a sectional view of same. Fig. 4 is the collar separate. Fig. 5 shows a form of insulating-ring separate. Fig. 6 is a collar with screw for clamping and binding; Fig. 7, a form of insulating-ring; Fig. 8, a form of insulating-ring with internal thread. Fig. 9 is a conduit-pipe threaded with collar and binding-screw.

Like letters refer to like parts.

In Figs. 1, 2, 3, and 4 the collar B is represented as made with a spring-loop B' and with the connecting-wire B² twisted into loop and soldered. This form of collar is in the nature of a spring-ring that is sufficiently elastic to force onto end of pipe and to hold firmly in metallic contact.

C is a protective insulating ring or cover for end of pipe A and is held in place by projections $b$ on collar B entering into groove $c$ in ring C, as shown in Fig. 3 or in part section in Fig. 7. The spreading of the collar when forcing it onto the pipe causes the projections $b$ to enter groove $c$ in C, or the ring can be made, as shown in Fig. 5, with a bayonet-fastening, the projections to enter the notches C' and turned in the groove $c$.

Fig. 6 shows the collar made with a screw D to close its open ends B³ and so grip the pipe and at the same time serve as a binding-post for the connecting-wire B⁴.

Fig. 9 is a modified form to show a collar F screwed onto pipe A' and having a binding post or screw F² holding the connecting-wire B⁵.

The use of the various forms is practically the same, the connecting-wire being attached to the collar. The collar is forced onto the pipe or clamped or screwed to pipe, thus avoiding the labor and time spent in soldering to the pipe.

Having described our invention, what we claim, and desire to secure by Letters Patent, is—

1. In connection with a metallic conduit-pipe, the combination of the pipe, the collar adapted to fit onto the pipe, and the connecting-wire attached to the collar, substantially as shown and described.

2. In combination with a collar adapted to fit onto a metallic conduit and a connecting-wire attached to the collar, means for attaching an insulating-ring, substantially as described for purposes described.

In testimony whereof we have signed our names to this specification in the presence of two subscribing witnesses.

ALFRED W. WATKINS.
    RUDOLPH LENK.

Witnesses:
    CARL V. LENK,
    JOHN NUTEY.